UNITED STATES PATENT OFFICE.

JOHN MURPHY, OF COLUMBUS, OHIO.

COMPOSITION OF MATTER.

SPECIFICATION forming part of Letters Patent No. 707,788, dated August 26, 1902.

Application filed March 7, 1902. Serial No. 97,026. (No specimens.)

*To all whom it may concern:*

Be it known that I, JOHN MURPHY, a citizen of the United States, residing at Columbus, in the county of Franklin and State of Ohio, have invented a new and useful Composition of Matter to be Used for the Production of Railway-Ties, Building Material, Pipes, Fence-Posts, &c., of which the following is a specification.

My composition consists of the following ingredients combined in the proportions stated, these proportions being determined by volume: hard iron slag, fifty parts; furnace-cinders containing from forty-eight to fifty-two per cent. of lime, thirty parts; Portland cement, fourteen parts; soluble silicate, two parts; water, four parts. Of the different grades of iron-slag which are produced ordinarily at blast-furnaces I employ the hardest, and therefore limit myself to the employment of "hard iron slag." These ingredients are thoroughly mingled by suitable means, and the concrete mass thus produced is adapted to be molded or otherwise shaped into desirable form and allowed to dry and harden. Prior to mixing with the remaining ingredients the hard iron slag is broken into small pieces and the cinders are pulverized. The soluble silicate mentioned in the list of ingredients of my composition is preferably that which is commonly termed "liquor of flints."

I am aware that both Portland cement and iron slag have been employed as elements in the making of a composition adapted for various purposes, but have found that by combining what is termed "hard iron slag" in a crushed condition with pulverized high-limed cinders and combining these elements with Portland cement and liquor of flints an exceedingly strong and durable composition is produced which will withstand great strain and the action of heat and cold without injury thereto.

It is obvious that in using my improved composition for railroad-ties, for which the same is particularly adapted, the blocks or ties formed thereof may be provided with suitable spike-openings, and such ties may be otherwise reinforced by metal, if desired.

What I claim, and desire to secure by Letters Patent of the United States, is—

The herein-described composition of matter consisting of crushed hard iron slag, pulverized high-limed cinders, Portland cement, liquor of flints and water, substantially as described.

JOHN MURPHY.

In presence of—
C. C. SHEPHERD,
W. L. MORROW.